United States Patent [19]

Hayman

[11] 4,110,492
[45] Aug. 29, 1978

[54] METHOD FOR ENCAPSULATING WATER-INSOLUBLE PARTICLES

[75] Inventor: Clifford C. Hayman, Mentor, Ohio

[73] Assignee: The Harshaw Chemical Company, Cleveland, Ohio

[21] Appl. No.: 740,905

[22] Filed: Nov. 11, 1976

[51] Int. Cl.$^2$ .................. B32B 9/00; B32B 15/02
[52] U.S. Cl. ..................... 427/214; 427/212; 428/403; 106/308 B; 427/215
[58] Field of Search .................. 423/300, 305; 106/308 B, 298, 309; 427/218, 212, 215, 214

[56] References Cited

U.S. PATENT DOCUMENTS

| 3,650,783 | 3/1972 | Yates | 106/308 X |
| 3,870,737 | 3/1975 | Birchall | 423/300 X |
| 3,946,134 | 3/1976 | Sherman | 427/212 |

FOREIGN PATENT DOCUMENTS 1,322,725  5/1970  United Kingdom .................. 423/305
1,358,286  7/1974  United Kingdom .................. 423/305

Primary Examiner—Ronald H. Smith
Assistant Examiner—S. Silverberg
Attorney, Agent, or Firm—James A. Lucas

[57] ABSTRACT

An improved method for encapsulating water-insoluble particles, particularly pigments, with dense, amorphous aluminum phosphate or fluorophosphate is disclosed. The capsules are formed in situ in an aqueous dispersion of the substrate by complexing aluminum and/or magnesium ion with phosphoric or fluorophosphoric acid, preferably in the presence of either boric acid or fluoride or complex fluoro ions. The encapsulation method comprises continuously adding separate solutions of the reactants into the dispersion over a 0.5 to 5.0 hour period, at 70° to 100° C., whereby a complex phosphate or fluorophosphate is deposited around the particles in the form of continuous, adherent microcapsules. The chemical, thermal and light stability of the substrate is thereby improved.

10 Claims, No Drawings

METHOD FOR ENCAPSULATING WATER-INSOLUBLE PARTICLES

BACKGROUND OF THE INVENTION

This invention comprises improvements in the field of particle encapsulation, especially relating to an improved method for the microencapsulation of pigments. The present invention relates directly to improvements over the particle encapsulation system disclosed in U.S. Pat. No. 3,946,134.

The use of metal-oxygen-phosphorus bonded polymers, especially aluminum-oxygen-phosphorus bonded polymers, to form protective coatings is well known. Network structures with the Al—O—P configuration have been prepared (H. H. Greger, U.S. Pat. No. 2,460,344) and used as insulating coatings. U.S. Pat. No. 3,538,136 discloses more sophisticated polymers based on the Al—O—P structural unit where the phosphorus, commonly in the form of phosphate, has been replaced with a phosphonate or phosphinate analog. More recently U.S. Pat. No. 3,955,017 claims transparent vitreous metal phosphate coatings on organic polymers derived from a metal phosphate complex. U.S. Pat. No. 3,946,134 uses an $AlPO_4$ complex to form microcoatings or capsules around particles.

This last system (U.S. Pat. No. 3,946,134) for the encapsulation of particles contrasts sharply with the then existing art in that it is applicable to both organic and inorganic particles, and produces a continuous, dense, protective capsule around each particle that provides one or more of at least ten recited advantages including improvements in one or more such characteristics as chemical stability, thermal stability, and light stability. The encapsulation is achieved by the slow homogeneous nucleation of a boric acid aluminum phosphate complex at the surface of the particles in an aqueous dispersion. The capsules so produced are between 15 and 200 A thick as determined by electron microscopy and are strongly bonded to the substrate particle by two further steps consisting of neutralization of the dispersion and subsequent dehydration of the encapsulated particles.

While this is a significant advance over prior art processes, certain deficiencies still remain in the process, resulting in a less than optimum encapsulation. In particular, the deposition of the coating is neither as efficient nor as controllable as desired. Further, the capsules in their final form are not as dense, impervious, and adherent as is possible. Additionally, the required dehydration step is a serious disadvantage if the particles are to be used in a wet state or processed further. Heretofore it was not readily apparent how these deficiencies could be overcome.

SUMMARY OF THE INVENTION

The principal object of the present invention is to provide an improved method of particle encapsulation by modification of the above mentioned encapsulation reaction so as to produce more dense, impervious and adherent microcapsules. Another object is to provide a means for conducting the encapsulation in a more efficient and controllable manner. A further object is to accomplish the particle encapsulation without the necessity of the dehydration step disclosed in U.S. Pat. No. 3,946,134.

According to the present invention it has been found that the deficiencies in the encapsulation process disclosed in U.S. Pat. No. 3,946,134 can be overcome by the improved method for encapsulating solid particulate substrates comprising continuously adding to an aqueous dispersion of the substrate, at 70° to 100° C., separate aqueous solutions of:

(a) Aluminum and/or magnesium ions, particularly mono or dibasic aluminum ions, which are added in the form of lower alkyl carboxylates or halo substituted lower alkyl carboxylates, and, (b) Orthophosphoric and/or mono and/or di-fluorophosphoric acid which may be present as a hydroxy aluminum phosphate-boric acid complex.

The resulting encapsulated particulate substrate is generally separated from the resulting dispersion.

Optionally, components (a) and (b) are added in the presence of:

(c) A coordinating species which may be either boric acid, $H_3BO_3$, or fluoride ion $F^-$, or a complex fluoro anion which may be fluoborate, $BF_4^-$ or hexafluorophosphate, $PF_6^-$, or combinations thereof.

Component (c) can be added in a separate solution (as in the case of fluoborate or hexafluorophosphate ions) or it can be co-dissolved with component (b). In addition, component (c) can be present in chemical combination with either component (a) as in the case of a dibasic aluminum carboxylate-boric acid complex, or component (b) as in the case of the hydroxy aluminum phosphate-boric acid complex.

The pH of the dipsersion during the encapsulation is controlled and maintained in the range 2.5 to 5.5 by maintaining the molar proportions of the magnesium and/or aluminum, the phosphorus and the other species of (c) in the co-reactants (a), (b) and (c) within the range 0.8:1.0:0.0 to 1.4:1.0:10.0. Sufficient quantities of the co-reactants are simultaneously added over the course of 0.5 to 5.0 hours to encapsulate the substrate in at least 5 and up to 50% of the complex metal phosphate or fluorophosphate, based on the total combined weight of substrate and capsule. The resulting encapsulated product is isolated, as by filtration, preferably washed, and may be dried at any convenient temperature below the decomposition temperature of the substrate or it may be used in the wet state.

DESCRIPTION OF THE PREFERRED EMBODIMENTS

Since this invention is an improvement over the system described in the aforementioned U.S. Pat. No. 3,946,134, the disclosure in that patent, excepting the method and details of the capsule formation, is appropriate and is hereby incorporated by reference.

The method of this invention is applicable to a wide variety of water-insoluble particulate substrates, i.e., inorganic, organic and metallo organic particles, such as inorganic color pigments including lead chromates by themselves, as coatings over silica, and as solid solutions with lead molybdate and lead sulfate; cadmium sulfides; ferrocyanides and various complex pigments such as cobalt aluminate and nickel antimony titanate; white hinding pigments such as the carbonates, sulfates and silicates of lead, and oxides of titanium, zinc, antimony and zirconium; fillers such as calcium carbonate, silicates of calcium, magnesium and aluminum, and sulfates of barium and calcium; metals such as aluminum, iron and copper and water insoluble salts of metals; organic color pigments including nitroso compounds, monoazo and diazo compounds, alizarine or dihydroxy anthraquinones, vat dyes and phthalocyanine pigments. Inorganic substrates are preferred.

The particles to be encapsulated are typically pretreated by passing them through a ball mill, micropulverizer, hammer mill, sand mill, or high speed blender such as a Waring Blender or by grinding them in a mortar and pestle. This serves to break up the particle agglomerates thereby enabling encapsulation of primary or individual particles. Such high shear mechanical pretreatment while dispersed in water is described, for example, in U.S. Pat. No. 3,639,133 and serves effectively to remove the molecular layer of air surrounding each particle, thereby facilitating complete wetting of each such particle.

Chemical pretreatment of the substrate particles with oxides or salts of aluminum, titanium, zirconium and/or cerium is also used to coat the particles with the corresponding hydrous metal oxides which, in some cases, substantially enhance the light stability of the final encapsulated particles. Such compounds are generally present in amounts ranging from about 0.1 to about 10 weight percent based on the weight of the substrate.

The present invention will be more readily understood by separate reference to the encapsulation components and encapsulation process.

Component (a) consists of an aqueous solution of aluminum and/or magnesium lower alkyl carboxylates or halo substituted carboxylates, examples of which are the formates, acetates, propionates, di and trichloroacetates and trifluoroacetates of aluminum or magnesium. For aluminum the preferred salts are the mono or dibasic carboxylates. It is preferred, although not necessary, that the aluminum ion be in an "inactive" state as in the form of a boric acid complex. Suitable compounds that contain such an inactive aluminum ion are boric acid complexes of dibasic aluminum acetate and formate such as, for example, a commercially-available aluminum acetate $Al(OH)_2OC(O)CH_3 \cdot \frac{1}{3}B(OH)_3$ and hydroxy aluminum phosphateboric acid complex (HAP). Other salts, both inorganic and organic, in which the metal is strongly complexed or which are moderately to strongly acidic upon hydrolysis are not suitable for use in this invention.

Component (b) consists essentially of an aqueous solution of orthophosphoric and/or mono or difluorophosphoric acid. It is understood that when the fluorophosphoric acids are used their ultimate hydrolysis products ($H_3PO_4$ and $HF$) may also be present in varying amounts. While the alkali salts of the fluorophosphoric acids can be used in small amounts, alkali phosphates are strictly excluded. Component (b) can also contain proportions of polyphosphoric acids, or sodium or ammonium acid polyphosphates, provided that they hydrolyze substantially to the orthophosphate form under the conditions of the encapsulation.

It is preferred that at least some of the total phosphate be present in the form of the hydroxy aluminum phosphate-boric acid complex (HAP). The complex is prepared by heating alumina with phosphoric acid in the presence of boric acid in the proportions:

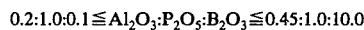
$0.2:1.0:0.1 \leq Al_2O_3:P_2O_5:B_2O_3 \leq 0.45:1.0:10.0$

Component (c) consists of an aqueous solution of boric acid and/or fluoride ions. The latter may be obtained from the partial hydrolysis of the fluorophosphoric acids or may be added as $NaF$, $NH_4F$, $NH_4HF_2$, or $HF$. Optionally, fluoborate ($BF_4^-$) or hexafluorophosphate ($PF_6^-$) ions may be present. These may be added as the acids, including dilute aqueous $BF_3$, or the sodium or ammonium salts. It is particularly preferred that boric acid be present, especially in the mol ratio of boron to total aluminum and/or magnesium metal of at least 1:1, where the boric acid is derived from HAP, from boric acid complexes of dibasic aluminum acetate or formate or from independent additions. For some applications it is preferred to have fluoride ions present with the boric acid. In these cases fluoborate ions can be substituted for the boric acid and fluoride with equivalent results.

In some cases components (b) and (c) are dissolved in a single solution.

In the preferred embodiment the encapsulation process of this invention, an aqueous slurry of the particulate substrate is first prepared at between 5 and 25 weight percent solids. Separate dilute aqueous solutions of 2 to 15, preferably 8 to 10, weight percent of the co-reactants (a) and (b) are prepared according to the desired composition of the complex metal phosphate capsule, particularly the desired molar proportions of the aluminum and/or magnesium, the phosphorus and the other species in component (c) in components (a), (b) and (c), and the total amount of complex metal phosphate needed to encapsulate the substrate. The components are added to separate metering devices and slow simultaneous addition is begun. The slurry is agitated vigorously and heated rapidly to a temperature of 70° to 100° C., which is maintained throughout the process. It is preferred that:

(1) the rates of addition of the components be such that the aluminum and/or magnesium is added at substantially the same molar rate as the phosphorus and (2) that this rate be calculated so that the additions are complete within 1 to 2 hours, preferably no more than 5 hours.

Component (c), if present, can be added as a separate solution during the process, or added to the slurry beforehand, but it is preferred that it be either co-dissolved with component (b) or added in a chemically combined state with either component (a) and/or (b). At the end of the addition the pH is within the range 2.5 to 5.5, preferably 3.5 to 4.5, and the slurry is free of soluble complex aluminum phosphate or fluorophosphate indicating that the formation of the capsules is complete.

Within the limits described above dilute conditions and longer encapsulation times (i.e. slower addition rates) are preferred since they tend to favor a more thorough encapsulation. However, they are not crucial to the practice of this invention.

The advantages of this process derive from its essential elements:

1. The efficient formation of a particularly dense, impervious capsule by continuously depositing the complex metal phosphate and/or fluorophosphate and continually replacing the reactants (capsule precursors) in the medium.
2. The concurrent formation of high bonding strengths (adherence) between the capsule and the substrate.

By the method of this invention the subject particles are completely encapsulated with a dense, adherent protective capsule layer having a thickness of between about 15 Å and about 200 Å, preferably between 60 Å and 120 Å as determined by electron microscopy. The average weight of the coating is between about 5 weight percent and about 30 weight percent of the total weight of the encapsulated particle. By this invention the encapsulation of particles having a relatively high surface area or relatively low density may require as high as 40 to 50 weight percent coating based on the total coated pigment weight in order to derive maximum benefit, but this is substantially less likely than with the earlier process.

At the completion of the encapsulation, the encapsulated particles can be further coated, if desired, with an anti-abrasive coating such as an aluminum rosinate. Such additional coatings do not appear to be critical where the encapsulated particles are to be incorporated into polystyrene, for example, but they are necessary where the encapsulated particles are to be incorporated into polyethylene or polypropylene.

Finally, the encapsulated particles are recovered from the aqueous dispersion by filtration or other means well-known in the art. It would be noted that with the method of this invention it is not necessary to dry the encapsulated particles to achieve the desired optimum encapsulation. Consequently, an anti-abrasive coating can be applied to the encapsulated particles without a drying step.

If a dry product is desired, the encapsulated particles, with or without after-coatings, can be dried by heating to a temperature below that likely to cause the substrate, capsule or other coating to degrade. A temperature of 50° to 150° C. has been found to be acceptable.

The following examples illustrate the preferred embodiments of this invention and are not intended to limit the scope of this invention which is properly delineated in the claims.

EXAMPLE I

Two light yellow finely divided 65 weight percent lead chromate — 35 weight percent lead sulfate pigments (CI-77603) were prepared by standard techniques by precipitation out of aqueous solution, pH adjustment with sodium carbonate solution to 5.6 to 6.0, recovery by filtration, washing with water and drying. The first pigment A was prepared without light stabilizers, sulfuric acid being used to precipitate the excess lead in solution as lead sulfate prior to the pH adjustment. The second pigment B was treated prior to pH adjustment by the addition to the aqueous solution at 5 minute intervals of separate aqueous solutions of aluminum sulfate, titanium sulfate and cerium nitrate such that the pigment B was calculated to have primarily as a pigment coating 2 weight percent alumina, 1 weight percent titania and 3 weight percent ceria, said weights calculated as the hydrous oxides based on the total weight of the dried pigment.

A twenty-three gram sample of each of pigments A and B was treated as follows in accordance with the method of this invention. For these treatments three solutions were prepared.

Solution X was 5.29 grams of the aluminum acetate employed in the examples of said patent U.S. Pat. No. 3,946,134 (available commercially from Union Carbide Corporation as Niaproof Aluminum Acetate, basic, stabilized with boric acid) dissolved in 62 ml. of water.

Solution Y was boric acid stabilized aluminum phosphate prepared by adding to 80 ml. of water 61.0 ml. of phosphoric acid (85.5%), 5.5 grams of boric acid and 25.0 grams of commercial high surface area alumina, heating the resulting slurry with stirring to and at 85°–90° C. until a colloidal dispersion is formed, cooling the dispersion to 25°–30° C. and adding water to adjust the total volume to 250 ml.

Solution Z was a solution of 0.92 gram of ammonium bifluoride, 0.50 gram of ammonium fluoborate, 1.84 grams of phosphoric acid (85.5%) and 4.6 mls. of Solution Y in 62 mls. of water.

Each pigment sample was added to 170 ml. of water, and each resulting slurry was blended for 10 minutes in a Waring Blender to break up pigment aggregates. Each resulting slurry was then transferred to a vessel to which was begun a simultaneous addition of Solutions X and Z, each at a rate of about 0.8 ml./minute. After about 10 percent (or 6–7 mls.) of each Solution had been added, each pigment slurry was heated rapidly to 80° C. and maintained at that temperature while continuing the same additions of Solutions X and Z until completed. Each resulting pigment slurry was neutralized to a pH of 5.0 with a 1:1 water:ammonium hydroxide solution. Each pigment while still in slurry was then coated with an aluminum rosinate by adding quickly 2.38 grams of additional aluminum acetate dissolved in 15 mls. of water and then adding dropwise over 5 minutes 1.65 grams of a commercial rosin (basically hydrogenated abietic acid) dissolved in 60 mls. of water at 85°–95° C. solubilized with a small amount of sodium hydroxide. Each pigment was then filtered out of its slurry, washed thoroughly with water and dried at 80° C.

A portion of each encapsulated pigment was mixed into an alkyd resin vehicle in an amount of 15 weight percent pigment, and a drawdown of such pigmented alkyd resin was exposed to a fadometer test for 100 hours. A portion of each encapsulated pigment was also mixed with polypropylene molding material in an amount of 1 weight percent pigment, and the pigmented polypropylene was injection molded at 575° F. (302° C.). Similar pigments A and B treated in accordance with the method of U.S. Pat. No. 3,946,134 as controls were also tested in like manner for purposes of comparison. The thermal stability of the respective molded polypropylenes containing pigments A and B treated in accordance with this invention was better than the thermal stability of the corresponding molded polypropylene containing the corresponding control pigments. The light stability of the alkyd resin containing pigment B treated in accordance with this invention was better than the corresponding alkyd resin containing control pigment B. The alkyd resins containing pigment A without light stabilizers had poor light stability after either pigment treatment.

Similar thermal stability results are achieved when the aluminum rosinate coating is omitted and the pigments are mixed and extruded with polystyrene.

Similar results are achieved when magnesium acetate is substituted mol per mol for the aluminum acetate in Solution X.

EXAMPLE II

Lead sulfochromate pigment C (CI-77603), prepared by conventional procedures well known in the art, is treated according to the disclosure of U.S. Pat. No. 2,365,171, example 1, whereby the pigment surfaces are coated with approximately 2 weight percent hydrous alumina, 1 weight percent hydrous titania and 3 weight percent hydrous ceria as in Example I. This pigment, after drying, serves as the base pigment for comparative treatments by the method of U.S. Pat. No. 3,946,134 and the process of this invention.

One portion C-1 of the lead sulfochromate pigment C is encapsulated according to the preferred method of this invention.

A solution U of hydroxy-aluminum phosphate-boric acid complex (HAP) is first prepared by heating 209.0 grams of phosphoric acid (85%), 11.0 grams of boric acid and 50.0 grams of a commercial high surface area hydrous alumina (Alcoa, Hydral #705) in 200 ml. of water to 85° to 95° C. and maintaining at this temperature until a colloidal dispersion is formed. The dispersion is cooled and diluted to give 630 grams of HAP solution (density = 1.2 grams/ml.).

Two separate solutions containing the reaction components are then prepared:

Solution V is 8.8 grams of a commercial dibasic aluminum acetate dissolved in 85 ml. of water.

Solution W is 22.1 grams of the HAP complex solution U, 1.8 grams of ammonium bifluoride and 1.1 grams of ammonium fluoborate dissolved in 40 ml. of water and then diluted to a total volume of 85 ml.

Fifty grams of lead sulfochromate pigment C is added to 500 ml. of water at 25° C. and agitated vigorously as a slurry for 15 minutes. Solutions V and W are added to separate burettes and simultaneous addition is begun at the rate of approximately 1.0 ml./minute for both solutions. The slurry is heated rapidly to 85° C. and maintained at this temperature throughout the course of the encapsulation. After the solutions have been completely added (1.25 hours) the pH is 4.0 at 85° C. A sample C-1$a$ of the slurry is taken for later analysis. The pH of the remaining slurry is then adjusted to 5.0 with 1:1 aqueous ammonia, and a second sample (C-1$b$) is taken. The remainder of the slurry of C-1 is filtered, washed and dried at 80° C. to a dry encapsulated pigment C-1$c$.

Another portion C-2 of the lead sulfochromate pigment C is encapsulated according to Example 1 of U.S. Pat. No. 3,946,134 where adjustments have been made to provide the same amount of encapsulating material calculated (as $AlPO_4$) that was used in the treatment of C-1.

Again 50.0 grams of the base pigment C is added to 500 ml. of water at 25° C. and agitated vigorously for 15 minutes. To the resulting slurry is added 11.8 grams of the commercial dibasic aluminum acetate in 70 ml. of water, followed by 1.8 grams of ammonium bifluoride and 1.1 grams of ammonium fluoborate in 40 ml. of water. After 3 minutes 7.3 grams of phosphoric acid (85.5%) is added dissolved in 70 ml. of water. The resulting slurry is agitated for 15 minutes and then a sample (C-2$a$) is taken for analysis. The pH of the balance of the slurry is then adjusted to 5.0 with 1:1 aqueous ammonia, and another sample (C-2$b$) of the slurry is taken. The remainder of the slurry of C-2 is then filtered, washed and dried at 80° C. to a dry encapsulated pigment C-2$c$.

CHARACTERIZATION AND COMPARISON OF THE PRODUCTS

1. Samples of the dried materials C-1$c$ and C-2$c$ from each process are examined by an X-ray diffraction powder technique. In both cases the lines typical of the various forms of crystalline aluminum phosphate are absent. The only crystalline component seen is monoclinic $PbCrO_4$. This is taken as indicative of the amorphous nature of the capsules. Upon elemental analysis both samples show the presence of considerable amounts of fluoride and boron.

2. The dried samples C-1$c$ and C-2$c$ are examined by electron microscopy. Micrographs (70,000X) in both cases show the presence of smooth, continuous capsules around discrete crystals. Very little, if any, superfluous encapsulating material is found in either case. However, a difference is observed in the thickness of the coatings, the capsules of the present invention having only approximately 80% of the wall thickness in comparison with the control capsules. Since both samples contain the same weight percent of complex metal phosphate or fluorophosphate and have the same initial surface area, the reduced thickness is taken as direct evidence of a more dense capsule.

3. Slurry samples C-1$a$ and C-2$a$, taken after the encapsulation but prior to neutralization, are examined to determine the relative efficiencies of each process. The slurries are filtered on 0.5 micron millipore and the clear filtrates examined for soluble complex aluminum phosphate or fluorophosphate by the addition of 1:1 aqueous ammonia to pH 7.0 in each case. The solution from the sample C-1$a$ remains clear while the solution from the sample C-2$a$ shows that about 15 to 20 percent of the encapsulating material was still in solution at the end of the encapsulation. The method of the present invention is therefore more efficient.

4. The adherence of the capsule to the pigment is tested under abrasive conditions. Samples C-1$c$ and C-2$c$ are mixed with granular polystyrene resin on a paint shaker for 3 minutes. The samples are then injection molded at 375° F. and 575° F. At the lower temperature essentially no interaction between the resin and lead chromate pigments occurs. However, at 575° F. extensive degradation of the pigment (observed as darkening) occurs if it is not protected by a microcapsule. The spectral reflectance (%R) of the samples at 600 nm is taken both at 375° F. and 575° F. and the percent change ($\Delta$%R) is computed. The sample C-1$c$ prepared by the method of this invention is superior in that it has a smaller $\Delta$%R.

5. The imperviousness of all the capsules of slurried pigments to acid and base is tested. The imperviousness is also tested under non-dissolving conditions to assess the porosity of the capsules prepared by each method. A sulfide indicator (black PbS) or a reducing agent indicator ($SnCl_2$) is used to show if the integrity of the capsule has been destroyed. In the latter case the stannous ion reduces the yellow hexavalent chromium ion to the green trivalent chromic ion. The following results demonstrate the advantages of the present method in producing a more impervious capsule.

| | Sample | | | |
|---|---|---|---|---|
| Resistance to: | C-1$a$ and C-1$b$ | C-1$c$ | C-2$a$ and C-2$b$ | C-2$c$ |
| .05M $SnCl_2$ + .3N HCl | excellent | excellent | poor | good |
| .05N NaOH + .05N $Na_2S$ | good | excellent | poor | good |
| $H_2S$ (Aqueous) | excellent | excellent | poor | good |

EXAMPLE III

Dibasic aluminum formate-boric acid complex (Al(OOCH)(OH)$_2$·$\frac{1}{3}$ B(OH)$_3$) is substituted on an equal mol basis for the commercial dibasic aluminum acetate in example II with substantially the same results.

EXAMPLE IV

A commercial 8% ($Al_2O_3$) monobasic aluminum formate (Al(OH)(OOCH)) substituted on an equal mol basis for the dibasic aluminum acetate used in Example II shows the present invention to be even more superior to the process of U.S. Pat. No. 3,946,134 than in the comparisons of examples II and III.

EXAMPLE V

A rutile $TiO_2$ pigment is encapsulated like C-1 of Example II in order to reduce its photoreactivity. Electron micrographs indicate the presence of continuous capsules around the crystals. The same can be accomplished with an aluminum powder pigment.

I claim:

1. The method for encapsulating a solid particulate substrate comprising continuously adding to an aqueous dispersion of a water-insoluble particulate substrate at 70° to 100° C. separate aqueous solutions of:
   (a) metal ions selected from the group consisting of aluminum and magnesium, said ions being added as lower alkyl carboxylates and/or halogen-substituted lower alkyl carboxylates,
   (b) phosphate anions added as acids selected from the group consisting of orthophosphoric acid, monofluorophosphoric acid and difluorophosphoric acid, at least some of the phosphate present in the form of a hydroxy aluminum phosphate boric acid complex, and, optionally,
   (c) anions selected from the group consisting of boric acid, fluoride, fluoborate and hexafluorophosphate anions, the molar proportions of (a), (b) and (c) being in the range of 0.8:1.0:0.0 to 1.4:1.0:10.0, and other anions and cations in or added to said dispersion being such as not to react with said substrate and not to interfere with the formulation of insoluble metal phosphate complexes of (a) and (b).

2. The method of claim 1 wherein said particulate substrate is inorganic.

3. The method of claim 2 wherein the concentration of total (a) and (b) in solution in said dispersion is maintained at a sufficient level to encapsulate said substrate in from 5 to about 50 weight percent of said metal phosphate complexes based on the total weight of the encapsulated particulate substrate.

4. The method of claim 3 wherein the time for addition of said components is in the range of from 0.5 to 5.0 hours.

5. The method of claim 4 wherein after said addition is completed, the resulting encapsulated particulate substrate is separated from the dispersion.

6. The method of claim 1 wherein said particulate substrate is precoated with up to 10 weight percent, based on the weight of said substrate, of hydrous metal oxides of metals selected from the group consisting of aluminum, titanium, zirconium and cerium.

7. The method of claim 6 wherein said particulate substrate is inorganic.

8. The method of claim 7 wherein the concentration of total (a) and (b) in solution in said dispersion is maintained at a sufficient level to encapsulate said substrate in from 5 to about 50 weight percent of said metal phosphate complexes based on the total weight of the encapsulated particulate substrate.

9. The method of claim 8 wherein the time for addition of said components is in the range of from 0.5 to 5.0 hours.

10. The method of claim 9 wherein after said addition is completed, the resulting encapsulated particulate substrate is separated from the dispersion.

* * * * *